(12) United States Patent
Chang et al.

(10) Patent No.: US 8,072,781 B2
(45) Date of Patent: Dec. 6, 2011

(54) ELECTRONIC DEVICE

(75) Inventors: Hung-Chieh Chang, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 318 days.

(21) Appl. No.: 12/566,695

(22) Filed: Sep. 25, 2009

(65) Prior Publication Data

US 2010/0328905 A1    Dec. 30, 2010

(30) Foreign Application Priority Data

Jun. 30, 2009    (CN) .......................... 2009 2 0305409

(51) Int. Cl.
*H05K 7/00*    (2006.01)

(52) U.S. Cl. .................. 361/825; 312/223.1; 248/205.1

(58) Field of Classification Search .................. 361/725, 361/810, 825; 312/223.1; 248/205.1
See application file for complete search history.

(56) References Cited

U.S. PATENT DOCUMENTS

| | | | |
|---|---|---|---|
| 6,621,692 B1 * | 9/2003 | Johnson et al. | 361/679.55 |
| 6,629,614 B2 * | 10/2003 | Jordan | 312/223.1 |
| 6,856,518 B2 * | 2/2005 | Dobbs et al. | 361/801 |
| 7,679,900 B2 * | 3/2010 | Lee et al. | 312/223.1 |
| 7,710,715 B2 * | 5/2010 | Furey et al. | 312/223.1 |
| 7,742,291 B2 * | 6/2010 | Wu et al. | 361/679.32 |
| 2005/0111198 A1 * | 5/2005 | Suekawa et al. | 312/223.1 |
| 2006/0044767 A1 * | 3/2006 | Wu et al. | 361/725 |

* cited by examiner

*Primary Examiner* — Lisa Lea Edmonds
(74) *Attorney, Agent, or Firm* — Altis Law Group, Inc.

(57) ABSTRACT

An electronic device includes a bracket, a rear plane, a mounting member, and a middle plane. The bracket is configured for receiving at least one hard disk drive therein, and includes a bottom plate. The rear plane is secured to the bracket. The mounting member secures the middle plane to the bottom plate, so that the middle plane is perpendicular to the bottom plate and parallel to the rear plane.

18 Claims, 7 Drawing Sheets

ELECTRONIC DEVICE

BACKGROUND

1. Technical Field

The present disclosure relates to electronic devices, and particularly to an electronic device with a Peripheral Component Interconnect (PCI) device.

2. Description of Related Art

A PCI device usually has a standard structure. In a server system, the PCI device can mount directly in a rear plane, which is secured to a disk drive bracket. In order to secure the PCI device in the server system, a chassis needs to be designed to secure the PCI device and engage the PCI device with the rear plane synchronously. Accordingly, different PCI devices require different chassis. It is thus desirable to provide a middle plane electronically coupling the PCI device with the rear plane usable among a variety of PCI devices.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
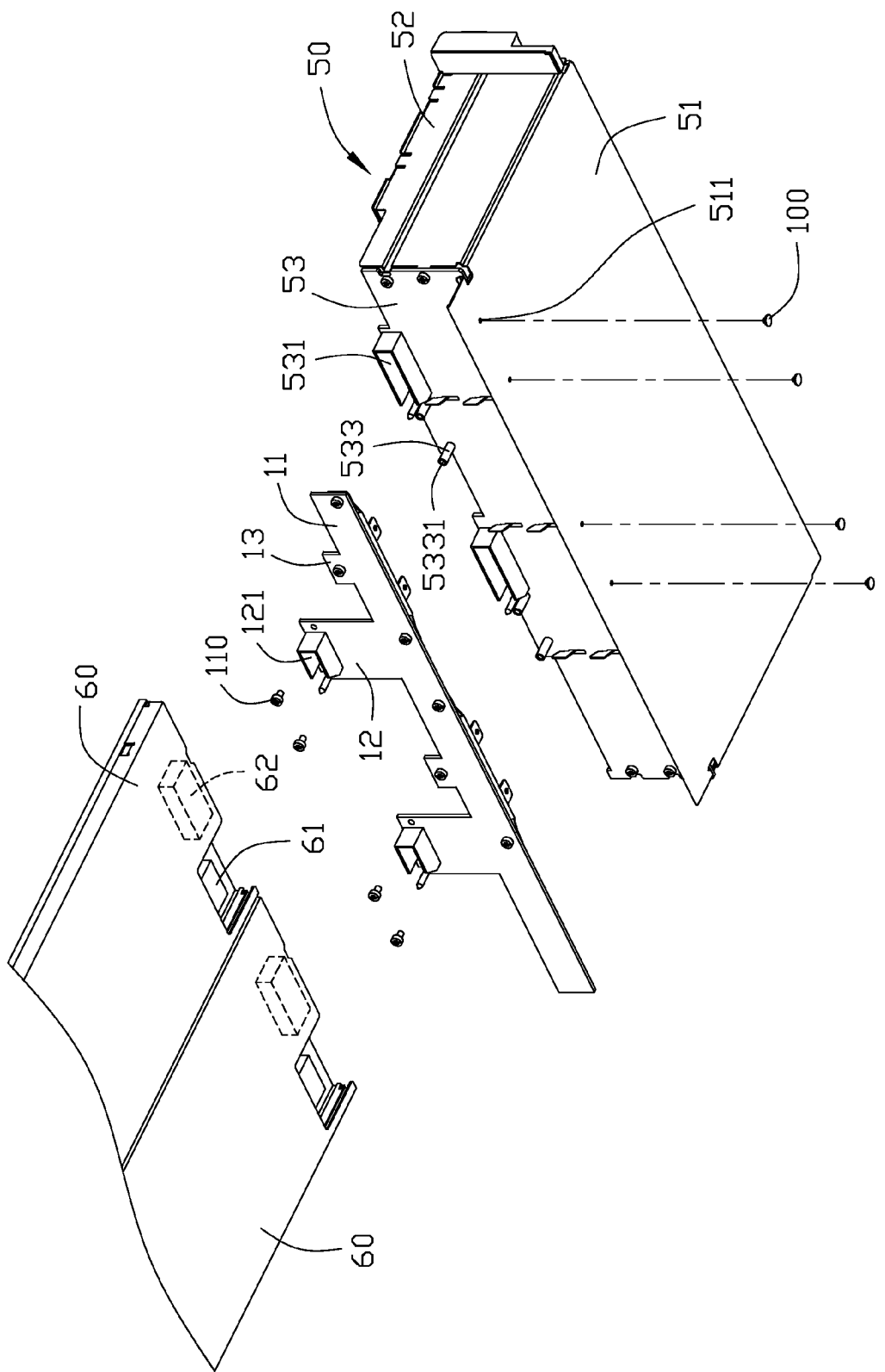
FIG. 1 is an exploded, isometric view of an electronic device and PCI devices in accordance with a first embodiment.
Figure 2:
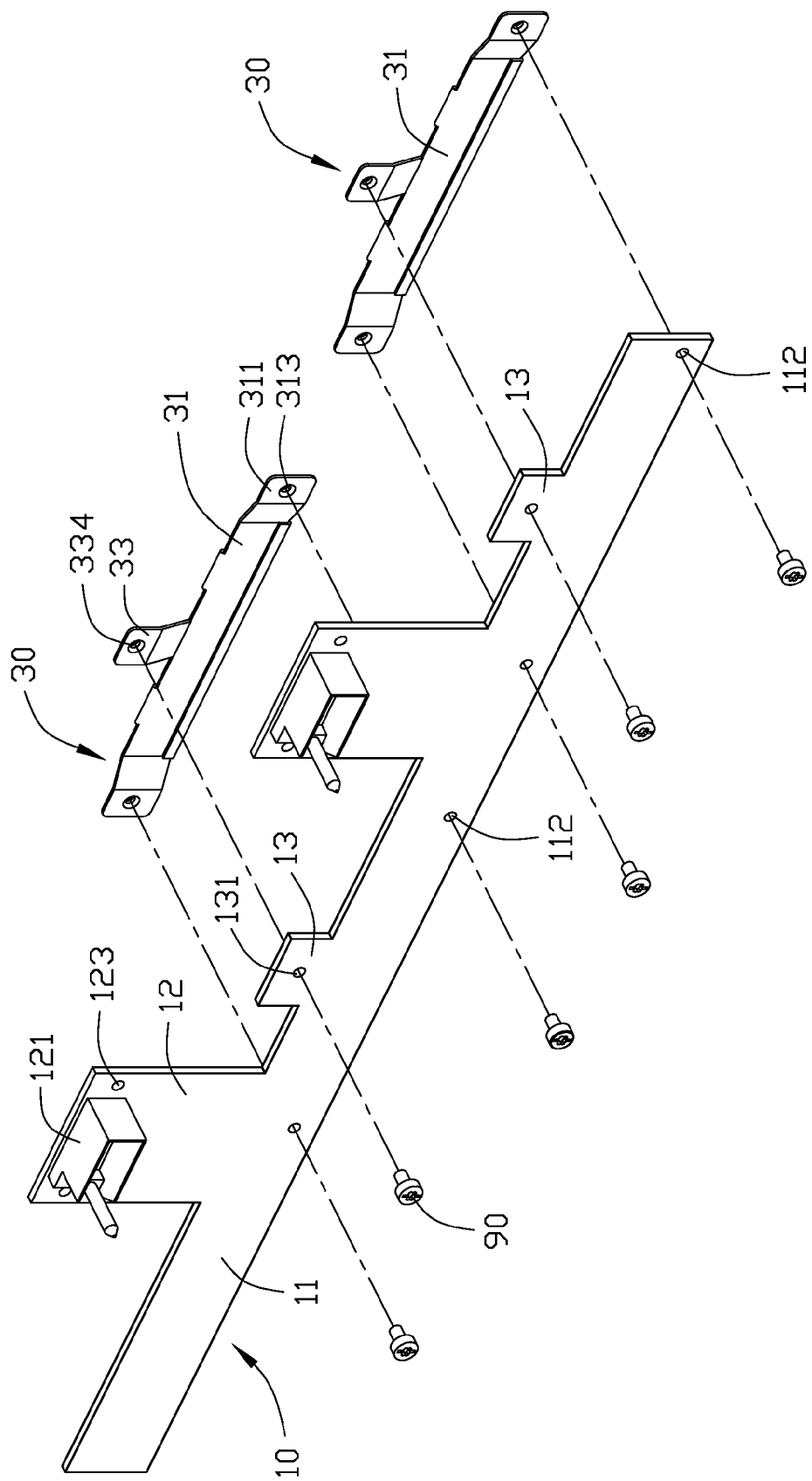
FIG. 2 is an exploded, isometric view of a middle plane and two mounting members of FIG. 1.
Figure 3:
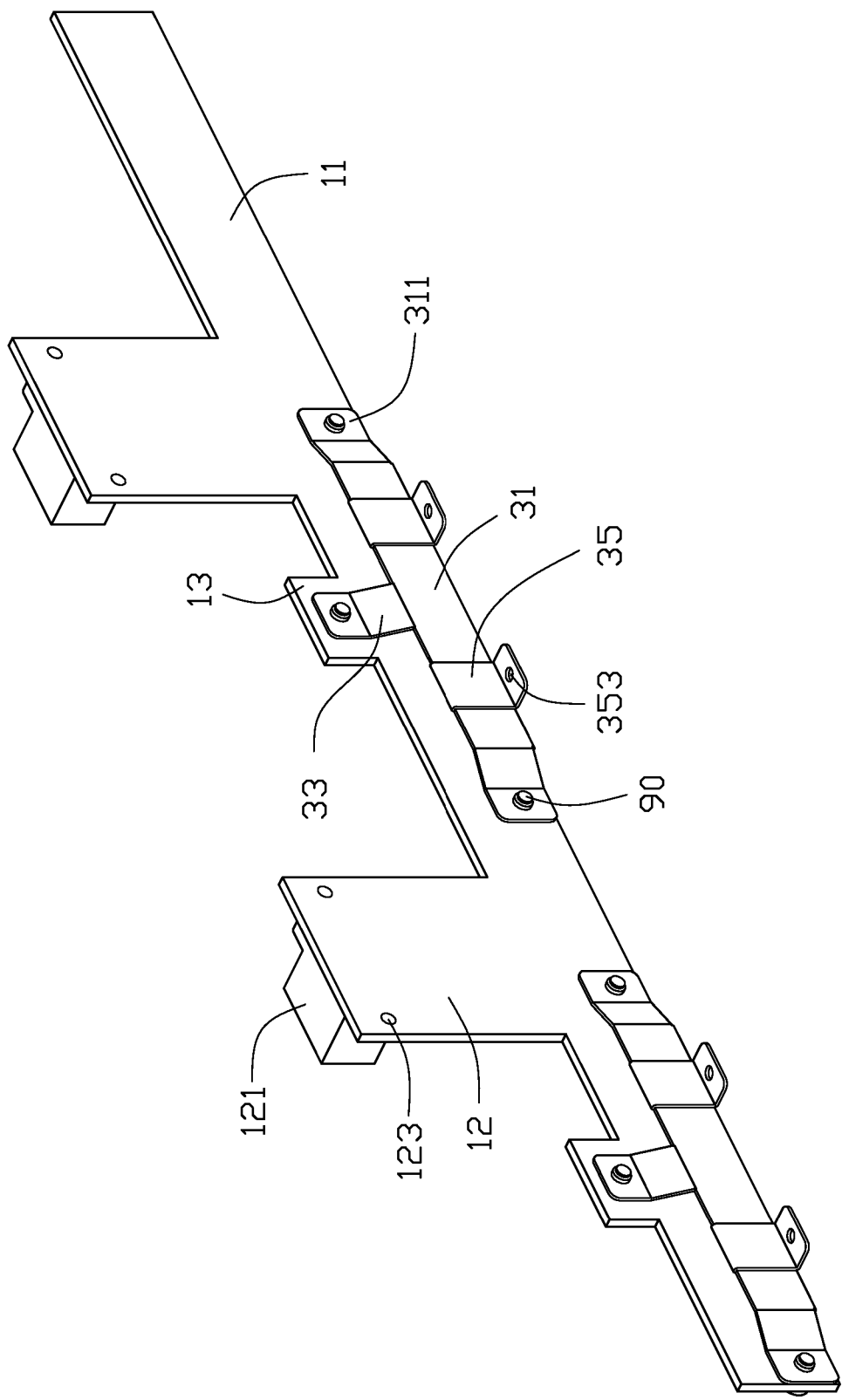
FIG. 3 is an assembled view of FIG. 2, viewed from another aspect.

Referring to FIGS. 1-3, an electronic device includes a bracket 50, a back plane 53, a middle plane 10, and two mounting members 30.

The bracket 50 is configured to hold at least one storage device, such as a hard disk drive, and includes a bottom plate 51 and two parallel side plates 52 perpendicular to the bottom plate 51. The bottom plate 51 is wider than a length of each side plate 52, so as to extend beyond a rear edge of each side plate 52. A plurality of mounting holes 511 is defined in the bottom plate 51.

The back plane 53 is a circuit board, and secured to the rear edges of the side plates 52. Two connectors 531 are located on a rear side of the back plane 53. Two posts 533 with securing holes 5331 defined therein are located on the rear side of the back plane 53 at the left of the two back plane connectors 531.

The middle plane 10 is a circuit board, and includes a base portion 11 and two extending portions 12 extending from an edge of the base portion 11 in a same direction. A plurality of fixing holes 112 is defined in the base portion 11. A tab 13 extends from the edge of the base portion 11 at the right side of each extending portion 12. A fixing hole 131 is defined in each tab 13. Two connectors 121 are located on the two extending portions 12 on one side. Two positioning holes 123 are defined in each extending portion 12 on two opposite sides of each middle plane connector 121.

The two mounting members 30 have the same structure, each including a base portion 31, a retaining portion 33, and two support portion 35. The base portion 31 has two bent ends 311, with each defining a mounting hoe 313 corresponding to the middle plane mounting hole 112. The retaining portion 33 extends up from a top edge of the base portion 31, and defines a retaining hole 334, corresponding to the fixing hole 131 of the middle plane 10. The support portions 35 are bent down from the top edge of the base portion 31, and then in a direction perpendicular to the base portion 31. A locating hole 353 is defined in each support portion 35, corresponding to the mounting hole 511 of the bottom plate 51.

Each PCI device 60 includes a first connector 61 and a second connector 62, lined up generally parallel to the middle plane 10. The PCI device first connector 61 is capable of electronically coupling to the middle plane connector 121.

Figure 4:
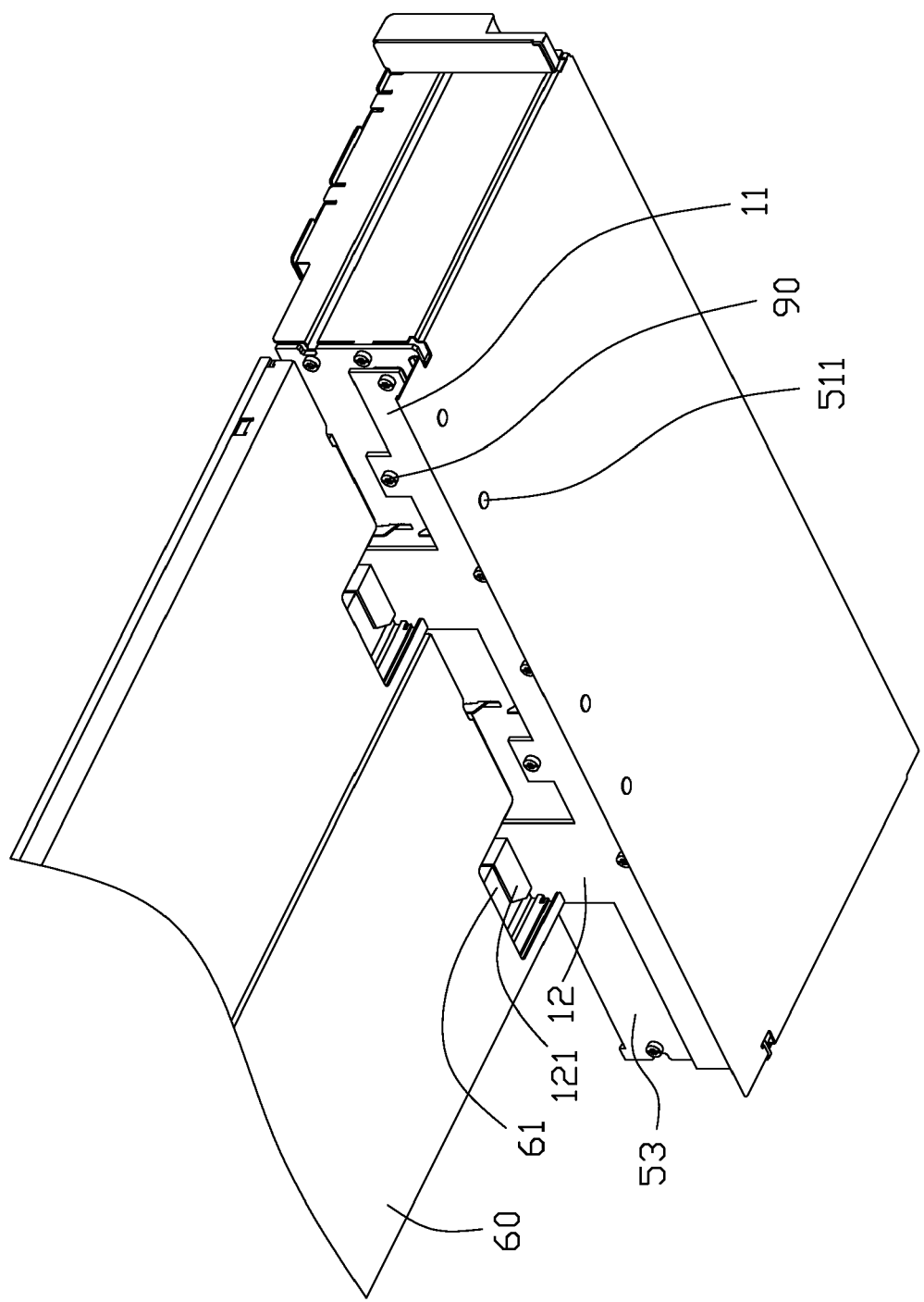
FIG. 4 is an assembled view of FIG. 1.

Referring also to FIG. 4, during assembly, the mounting member 30 is placed on a side of the middle plane 10 opposite to the middle plane connectors 121. The retaining hole 334 of mounting member 30 is aligned with the fixing holes 131 of the middle plane 10, and the mounting holes 313 of the mounting member 30 are aligned with the mounting holes 112 of the middle plane 10. Three first fasteners 90 are secured in the retaining holes 334 of the mounting member 30 and the fixing holes 131 of the middle plane 10, the mounting holes 313 of the mounting member 30 and the mounting holes 112 of the middle plane 10, so as to secure each of the mounting members 30 on the middle plane 10. At this time, only the bent portion 313 and the retaining portion 334 of each mounting members 30 abuts the middle plane 10.

The middle plane 10, together with the mounting member 30 is then placed on the bottom plate 51, and the middle plane 10 is parallel to the rear plane 53. The locating holes 353 of the mounting member 30 align with the mounting holes 511 of the bottom plate 51, and the positioning holes 123 of the middle plane 10 with the back plane securing holes 5331. A plurality of second fasteners 100 are secured in the locating holes 353 of the mounting member 30 and the mounting holes 511 of the bottom plate 51, and a plurality of third fasteners 110 are secured in the positioning holes 123 of the middle plane 10 and the securing holes 5331 of the back plane 53, to secure the middle plane 10 together with the mounting members 30 on the bottom plate 51.

Two PCI devices 60, each with first and second connectors 61, 62 are placed in the electronic device, and the PCI device first connectors engage the middle plane connectors 121, to support the PCI devices 60. The mounting members 30 prevent the middle plane 10 from deforming under the weight of the PCI devices 60. In addition, the rear plane connectors 531 electronically couple to the PCI device second connectors 62 with flexible cable (not shown).

Figure 5:
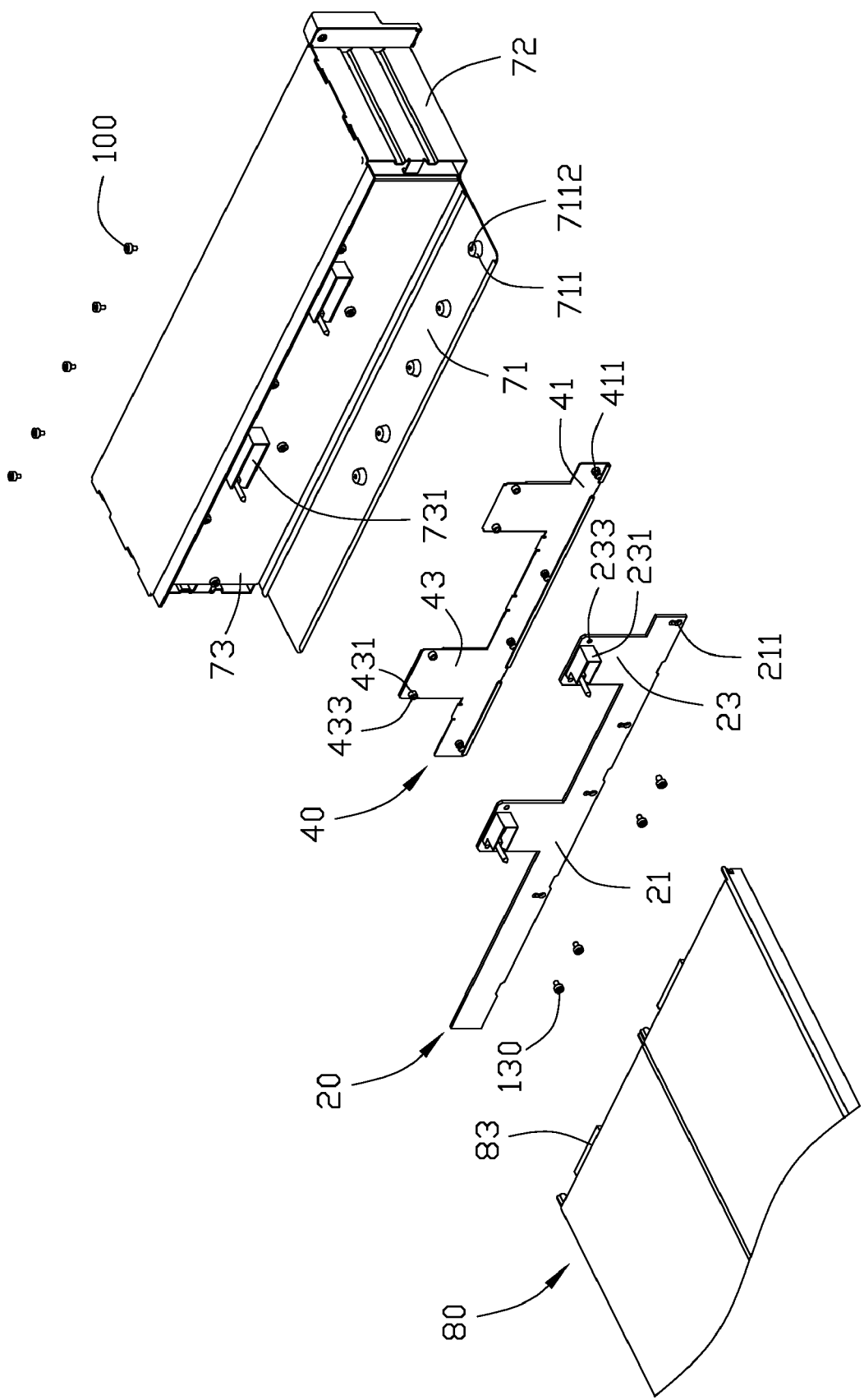
FIG. 5 is an exploded, isometric view of an electronic device and PCI devices, in accordance with a second embodiment.
Figure 6:
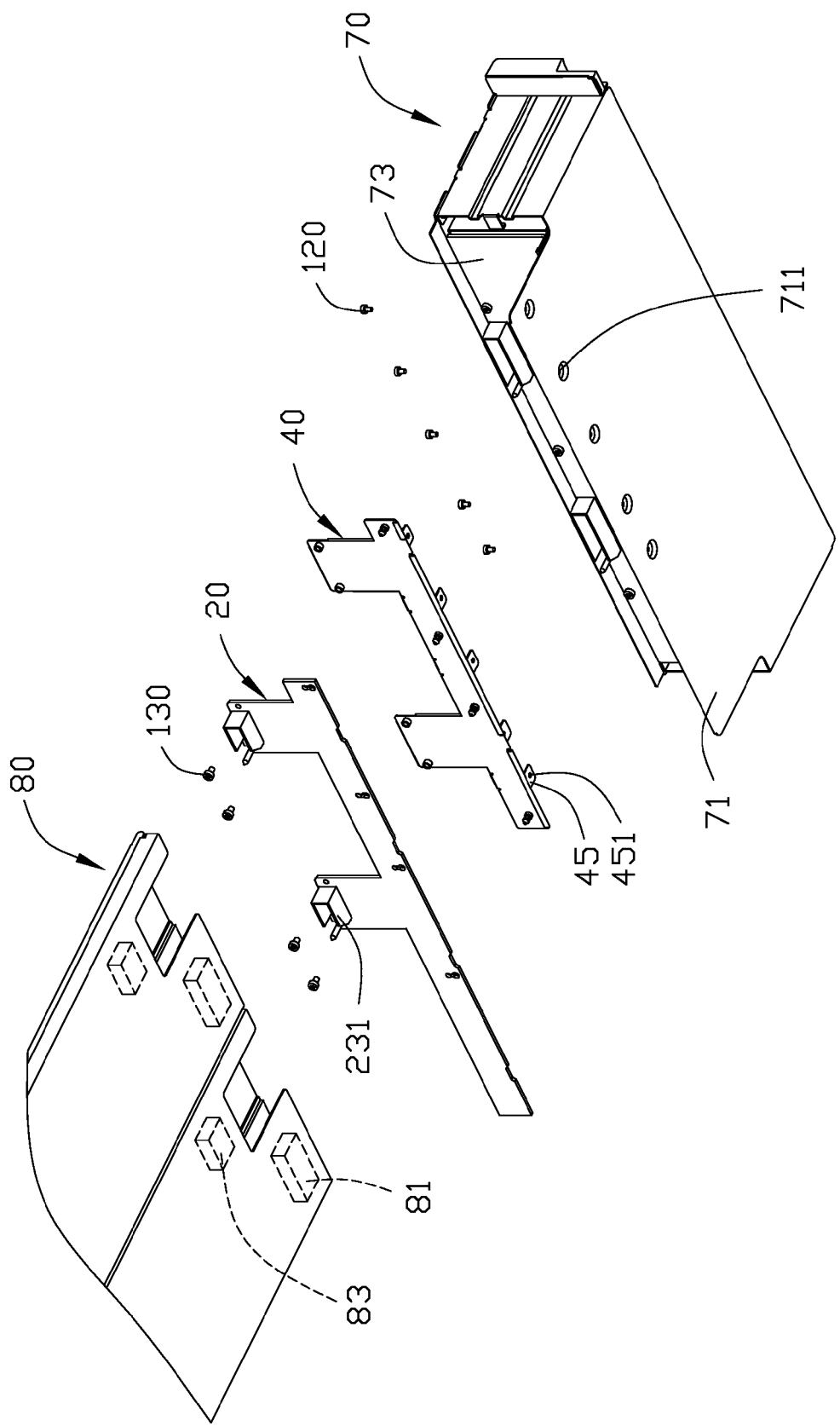
FIG. 6 is similar to FIG. 5, viewed from another aspect.

Referring to FIGS. 5-6, in a second embodiment, the electronic device includes a bracket 70, a back plane 73, a middle plane 20, and a mounting member 40.

The bracket 70 is configured to hold at least one storage device, such as a hard disk drive, and has a structure similar to bracket 50, also including a bottom plate 71 and two parallel side plates 72 perpendicular to the bottom plate 71. The bottom plate 71 is wider than a length of each side plate 72, so as to extend beyond a rear edge of each side plate 72. A plurality of protrusions 711 each with a mounting hole 7112 is located on the bottom plate 71.

The back plane 73 is similar to the back plane 53, also secured to the rear edges of the side plates 72. Two connectors 731 are located on a rear side of the back plane 73.

The middle plane 20 has a structure similar to the middle plane 10, also including a base portion 21 and two extending portions 23 extending from a top edge of the base portion 21 in the same direction. A plurality of lock-hole shape fixing holes 211 is defined in the base portion 21. Two connectors 231 are located on the two extending portions 23 on one side. Two positioning holes 233 are defined in each extending portion 23 on two opposite sides of each middle plane connector 231.

The mounting member 40 have a structure similar to the mounting member 30, including a base portion 41, a retaining portion 43, and a plurality of support portions 45. A plurality of positioning posts 411 is located on a rear side of the base portion 41, removably engageable in the middle plane mounting hole 211. The retaining portion 43 extends up from a top edge of the base portion 41, and two retaining posts 431 each with a retaining hole 433 are located on each retaining portion 43, corresponding to the fixing hole 233 of the middle plane 20. The support portions 45 are bent down from the top edge of the base portion 41, and then in a direction perpendicular to the base portion 31. A locating hole 451 is defined in each support portion 45, corresponding to the mounting hole 711 of the bottom plate 71.

Figure 7:
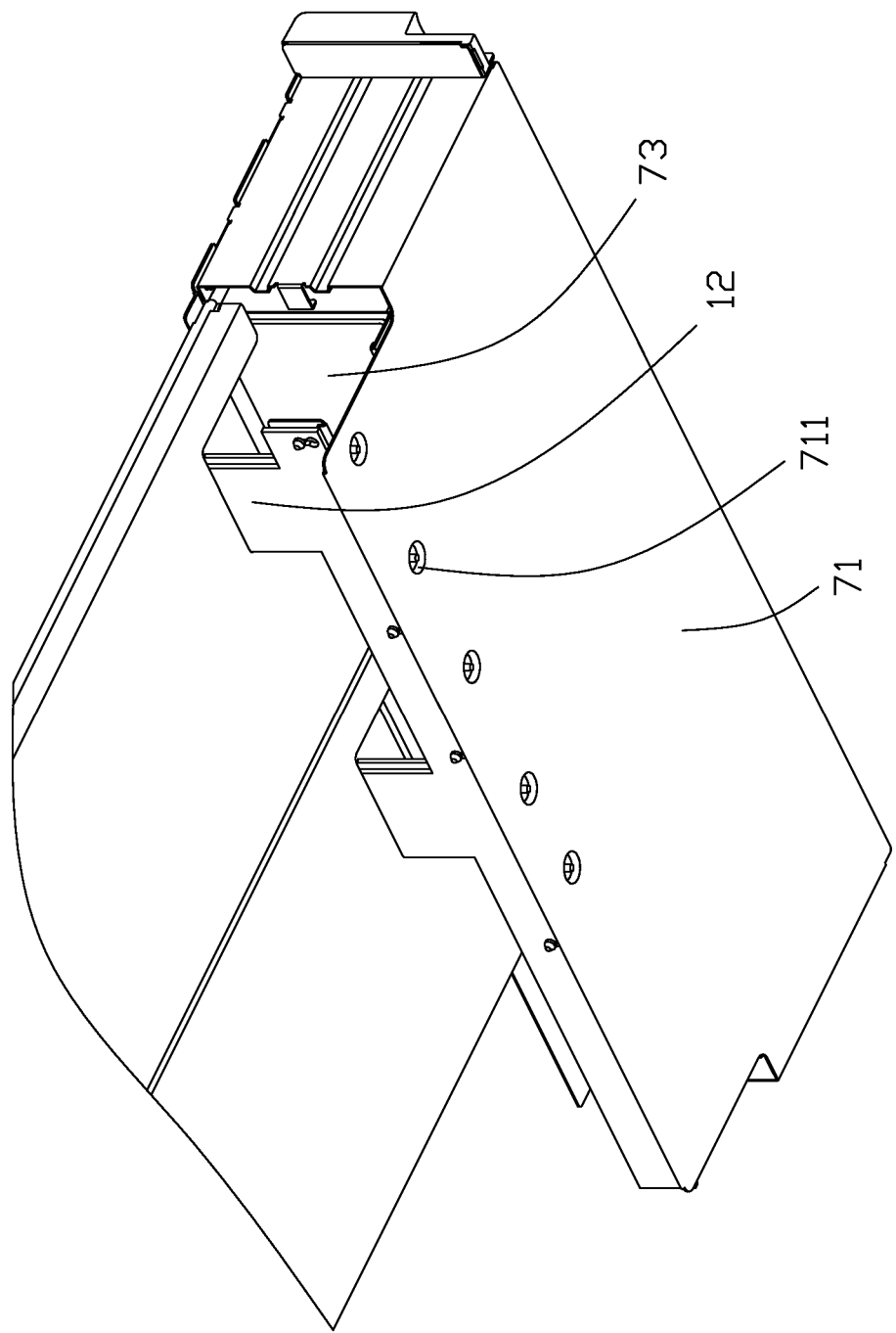
FIG. 7 is an assembled view of FIG. 6.

Referring also to FIG. 7, during assembly, the mounting member 40 is placed on the bottom plate 71. The locating holes 451 of the mounting member 40 are aligned with the protrusion mounting holes 7112. A plurality of fourth fasteners 120 are fixed in the locating holes 451 of the mounting member 40 and the protrusion mounting holes 7112 of the bottom plate 71, so as to secure the mounting member 40 on the bottom plate 71. The mounting member positioning posts 411 engage the fixing hole 211 of the middle plane 20, and the middle plane 20 lowers to align the fixing holes 233 of the middle plane 20 with the retaining holes 433 of the mounting member 40. A plurality of fifth fasteners 130 is fixed in the fixing holes 233 of the middle plane 20 and the retaining holes 433 of the mounting member 40, to secure the middle plane 20 on the mounting member 40. At this time, the mounting members 40 abut the middle plane 20 via the mounting member positioning posts 411 and the mounting member retaining posts 431, so as to separate the middle plane 20 from the mounting member 40.

Two PCI devices 80 are placed in the electronic device. Each PCI device 80 is similar to PCI device 60, and includes a first connector 81 and a second connector 83 positioned in a different line relative to the first connector 81. The PCI devices 80 are moved to engage the PCI device first connectors 81 with the rear plane connectors 731, and to engage the PCI device second connectors 83 with the middle plane connectors 231, respectively, so as to stably support the PCI devices 80 in the electronic device.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device comprising:
   a bracket configured for receiving at least one hard disk drive therein, the bracket comprising a bottom plate;
   a rear plane secured to the bracket;
   a mounting member; and
   a middle plane; wherein
   the mounting member secures the middle plane to the bottom plate, so that the middle plane is perpendicular to the bottom plate and parallel to the rear plane.

2. The electronic device of claim 1, wherein a connector is located on the middle plane and capable of engaging a first connector of a Peripheral Component Interconnect (PCI) device.

3. The electronic device of claim 2, wherein a connector is located on the rear plane capable of engaging a second connector of the PCI device.

4. The electronic device of claim 1, wherein a post is located on the rear plane, and fixed on the middle plane.

5. The electronic device of claim 1, wherein the mounting member comprises a base portion and a support portion extending from the base portion; the base portion is secured to the middle plane, and the support portion is secured to the bottom plate.

6. The electronic device of claim 5, wherein the support portion extends from a top edge of the base portion of the mounting member, and is bent to be perpendicular to the base portion of the mounting member.

7. The electronic device of claim 1, wherein the bracket further comprises a side plate perpendicular to the bottom plate; the middle plane is perpendicular to the side plate; and the rear plane is secured to the side plate.

8. The electronic device of claim 1, wherein a plurality of retaining posts is located on the mounting member; and the retaining posts are secured to the middle plane so as to separate the middle plane from the mounting member.

9. The electronic device of claim 1, wherein the middle plane and the rear plane are circuit boards.

10. An electronic device comprising:
    a bracket configured for holding at least one hard disk drive therein, the bracket comprising a bottom plate and a side plate perpendicular to the bottom plate;
    a middle plane; and
    a mounting member comprising a base portion and a support portion extending from the base portion, wherein the base portion is secured to the middle plane, and the support portion is secured to the bottom plate, so that the middle plane is perpendicular to the bottom plate and the side plate.

11. The electronic device of claim 10, further comprising a rear plane secured to the side plate of the bracket, and parallel to the middle plane.

12. The electronic device of claim 11, wherein a connector is located on the middle plane and capable of engaging a first connector of a Peripheral Component Interconnect (PCI) device.

13. The electronic device of claim 12, wherein a connector is located on the rear plane capable of engaging a second connector of the PCI device.

14. The electronic device of claim 11, wherein a post is located on the rear plane; and fixed on the middle plane.

15. The electronic device of claim 10, wherein the mounting member comprises a base portion and a support portion extending from the base portion; the base portion is secured to the middle plane, and the support portion is secured to the bottom plate.

16. The electronic device of claim 15, wherein the support portion extends from a top edge of the base portion of the mounting member, and is bent to be perpendicular to the base portion of the mounting member.

17. The electronic device of claim 10, wherein a plurality of retaining posts is located on the mounting member; and the retaining posts are secured to the middle plane so as to separate the middle plane from the mounting member.

18. The electronic device of claim 11, wherein the middle plane and the rear plane are circuit boards.

* * * * *